Feb. 4, 1930.  A. WILLIAMS ET AL  1,746,176
FOOD CUTTER
Filed Dec. 20, 1928
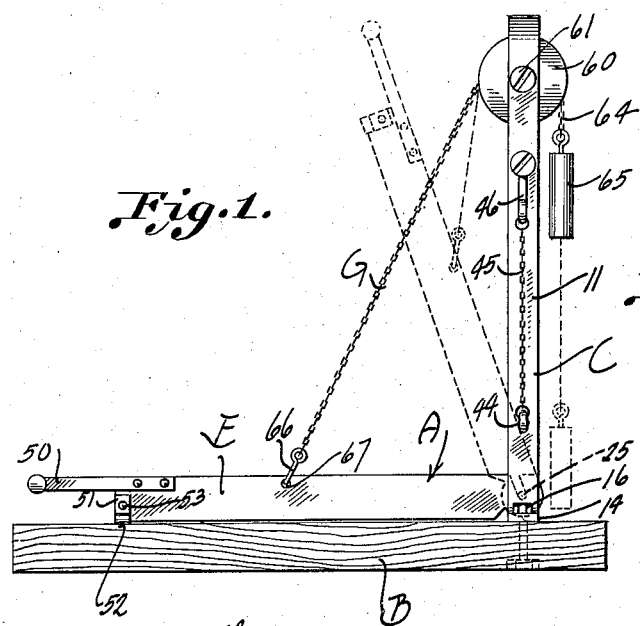
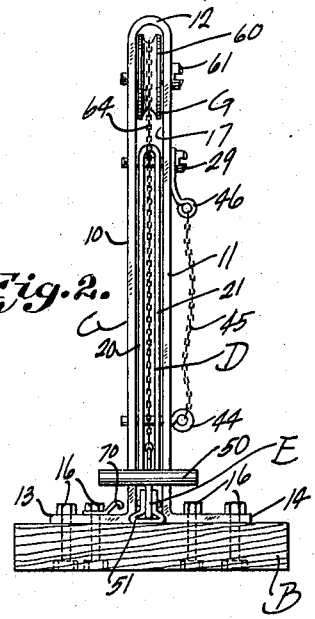
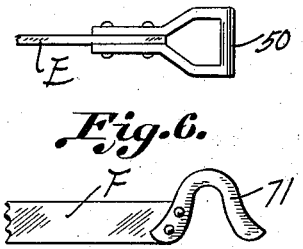
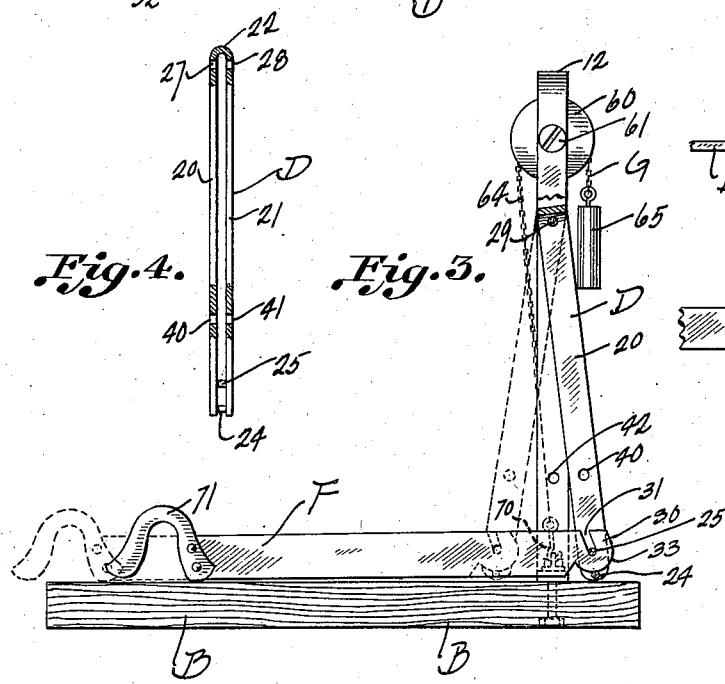
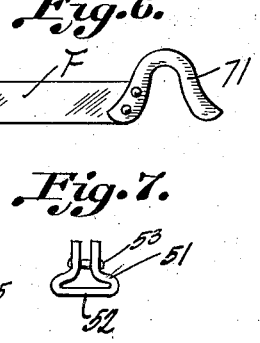
INVENTORS
*Andrew Williams*
AND *John Bontya*
BY *Lancaster and Allwine*
ATTORNEYS.

Patented Feb. 4, 1930

1,746,176

UNITED STATES PATENT OFFICE

ANDREW WILLIAMS AND JOHN BONTYA, OF PHILADELPHIA, PENNSYLVANIA

FOOD CUTTER

Application filed December 20, 1928. Serial No. 327,429.

This invention relates to improvements in cutting mechanisms.

The primary object of this invention is the provision of an improved cutting device which is particularly well adapted for the efficient and easy cutting of lobsters, fish or meat, either by means of a pivoted chopping or reciprocatory cutting action.

A further object of this invention is the provision of improved cutting apparatus embodying improved means for interchangeably receiving a plurality of blades which are respectively best adapted for different cutting operations.

Other objects of this invention will be apparent during the course of the following detailed description.

In the accompanying drawing, forming a part of this specification, and wherein similar reference characters designate corresponding parts throughout the several views, Figure 1 is a side elevation of the improved cutter, when used for cutting lobsters lengthwise.

Figure 2 is an end elevation of the improved cutter with the details assembled as shown in Figure 1.

Figure 3 is a side elevation of the improved cutter with a different blade than that shown in use on the device in Figure 1, and with the parts so arranged that the blade may be given a pivotal and reciprocatory swinging action for cutting meat, fish, and the like with forcefulness and with ease.

Figure 4 is a view, partly in section, showing the blade supporting hanger which may be held stationary or pivoted upon the frame of the cutter.

Figure 5 is a view of a handle end of the blade which is used for cutting lobster and the like with a pivotal chopping action.

Figure 6 is a view of the handle of the type of blade which is used during a reciprocatory swinging action, such as when cutting fish and meat.

Figure 7 is a view of a stop piece which is used to limit the movement of the lobster cutting blade, so as to prevent the cutting edge thereof from damaging the base block.

In the drawing, wherein for the purpose of illustration is shown only a preferred embodiment of the invention, the letter A may generally designate the improved cutter which may comprise a cutting block or base B having an upright or frame C carried thereby and supporting thereon a blade supporting hanger D either for stationary or pivotal movement with respect thereto. Interchangeable blades E and F may be provided for quick attachment or detachment with respect to the hanger D, and in connection with the blade E counter-weight means G may be provided to facilitate the chopping action.

The block B may be of wood, or any other approved construction which is suitable for the purpose of cutting meats, fish and the like thereon. It is preferably relatively thick and rectangular in form and adapted to rest horizontal.

The frame or upright C is preferably of inverted U-shaped formation, comprising the parallel side upright portions 10 and 11, connected at the upper ends thereof by a bight 12. At the lower ends thereof the sides 10 and 11 are outturned in opposite directions to provide attaching feet 13 and 14, each of which is preferably connected by a pair of detachable bolts 16 upon the base B at one end thereof, so that the space 17 between the upright portions 10 and 11 faces longitudinally along the central longitudinal axis of the base block B.

The hanger D is of inverted U-shaped formation, including the side portions 20 and 21, connected at their upper ends at 22, and at their lower ends being connected by relatively spaced lower and upper transversely extending pins 24 and 25 respectively. The spacing of the sides 20 and 21 of the hanger D is such that the hanger D may be slipped into the space between the sides of the supporting frame C for pivotal swinging movement therein. Adjacent the top connection 22, the sides 20 and 21 of the hanger D are apertured at 27 and 28 respectively, for receiving therethrough a detachable pivot bolt or pin 29 which is carried by the sides of the frame C in such relation that the lower ends of the sides of the hanger D will not engage against the base block B during swinging action. The pins 24 and 25 are provided to enable a quickly detachable pivotal connection of the blades E and F upon the lower end of the hanger D. The blades E and F are each constructed alike in so far as said connection is concerned, having the blade bodies thereof provided with reduced forward ends 30, having a preferably straight slot 31 extending from the upper edge of the blade body, towards the adjacent end and at an acute angle to the length of the blade body. The outer edge 33 of the connecting end 30 of the blades are preferably convex, and struck from a radius whose center lies in the dead end of the slot 31. To assemble either of the blades E or F upon the lower end of the bracket or hanger D it is merely necessary to position said blades substantially parallel with the bracket D, and in this connection it is to be noted that the blades will fit into the space between the sides of the hanger D; inserting the free end portion at the fore end of the blade between the slot 31 and the end edge, into the space between the pins 24 and 25, so that the pin 25 enters the slot 31, and then by tipping the blade downwardly away from the hanger it should be noted that the blade pivots on the upper pin 25 and is held against removal therefrom by the lower pin 24 riding against the convex surface 33. This permits a pivotal movement of the blade upon the lower end of the hanger D against liability of detachment, except by substantially a parallel positioning of the blade with the hanger.

When using the improved cutting mechanism for the cutting of lobsters and the like, when it is merely desired to have a pivotal chopping action, the hanger D is maintained immovable upon the frame C. To this end the sides 20 and 21 of the hanger D, below its pivotal mounting, is provided with a plurality of aligning openings 40 and 41, shown in Figure 4 of the drawing, and when pivotally mounted upon the frame C said openings align with similar openings 42 provided in the sides 10 and 11 of the frame C. These openings are adapted to receive a detachable pin or eye bolt 44, held by a chain 45 upon a hook 46 which may be attached to a side of the frame C. When the pin is in position in these openings it is quite apparent that the hanger D is held immovable.

The lobster chopping blade E is pivotally connected to the lower end of the hanger D in the manner above described, and this blade E is of any desired length, provided with a lower cutting edge. At the free end the blade is provided with a loop handle 50, such as shown in Figure 5 of the drawing, and at said free end the blade E is also provided with a substantially U-shaped stop member 51, provided with a foot 52 adapted to engage against the top surface of the base block B to hold the cutting edge of the blade E just slightly spaced above the top surface of the base block B to prevent mutilation of the latter. This stop member 51 is riveted or otherwise secured at 53 upon the free end of the blade or knife E.

The counter-weight means G is adapted to be used in connection with the blade E, when cutting lobsters and the like, by means of a chopping action. This counter-weight means G preferably includes a pulley 60 rotatably supported upon a pin 61 which is detachably carried at the upper ends of the sides 10 and 11 of the frame C, in the space between said sides; said pulley 60 having a chain or cable 64 trained thereover. The chain or cable 64 has a counter-weight 65 at the rear of the frame C, and at the front of the frame C the cable 64 is detachably connected as by means of a hook 66 with an opening 67 provided in the blade E intermediate the ends thereof.

When using the fish or meat cutting blade F, the counter-weight means G is not used, and under these circumstances the hook 66 is detachably connected to a hook 70, shown in Figure 2 of the drawing, which holds the counter-weight mechanism inoperative, as is shown in Figure 3 of the drawing. The fish and meat cutting blade F is the same in all respects as the blade G above described, except that a handle 71, quite similar to an ordinary saw handle, is connected therewith, which will enable a reciprocatory oscillating action of the blade, as will be quite apparent from Figure 3 of the drawing.

From the foregoing description of this invention it is apparent that the blade E may be used as above described and as shown in Figure 1 for powerful cutting and chopping action upon any article placed upon the base block B. The device may be arranged and the blade F substituted without alteration of any parts, to provide a cutter having a blade with a powerful reciprocatory and oscillating action, by means of which food stuffs may be most efficiently cut.

Various changes in the shape, size, and arrangement of parts may be made to the form of invention herein shown and described, without departing from the spirit of the invention or the scope of the claims.

We claim:

1. In cutting mechanism of the class described a base block, an upright mounted on the base block, a hanger pivoted on the upright, a blade pivotally mounted on the hanger at a location below the pivot of the hanger on the upright, means to releasably prevent pivotal action of the hanger on the upright, and releasable counter-weight means connected with the upright and blade to assist in the operation of the latter.

2. In cutting mechanism of the class described a base block, an inverted U-shaped upright mounted on the base block, an inverted U-shaped hanger pivoted at its upper end to the upright and operating within the U-shaped upright, a blade, means connecting the blade at an end to the lower end of the hanger for pivotal action thereon, means to prevent pivotal movement of the hanger upon the upright, and counter-weight means associated with said upright and connected with the blade to assist in operating the latter.

3. In cutting mechanism of the class described a support having a pair of spaced pins thereon, a blade having a slot transversely thereacross at an end thereof in such relation that the end of the blade may be slipped between the pins and one of the pins into the slot for pivoting the blade upon the pin in said slot in a supported position against removal by the other pin.

ANDREW WILLIAMS.
JOHN BONTYA.